US009954295B2

(12) United States Patent
Genetti et al.

(10) Patent No.: US 9,954,295 B2
(45) Date of Patent: Apr. 24, 2018

(54) MIDPLANE INTERCONNECT SYSTEM WITH CONDUCTOR TWIST MITIGATION

(71) Applicant: Intel Corporation, Santa Clara, CA (US)

(72) Inventors: Wayne Genetti, Sanatoga, PA (US); Vladimir Tamarkin, Huntingdon Valley, PA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/583,159

(22) Filed: May 1, 2017

(65) Prior Publication Data

US 2017/0237189 A1 Aug. 17, 2017

Related U.S. Application Data

(62) Division of application No. 14/581,119, filed on Dec. 23, 2014, now Pat. No. 9,697,160.

(51) Int. Cl.
*G02B 6/28* (2006.01)
*H01R 12/71* (2011.01)
*G02B 6/44* (2006.01)
*G06F 1/18* (2006.01)
*G06F 13/40* (2006.01)

(52) U.S. Cl.
CPC ........... *H01R 12/71* (2013.01); *G02B 6/4452* (2013.01); *G02B 6/4463* (2013.01); *G06F 1/189* (2013.01); *G06F 13/4022* (2013.01)

(58) Field of Classification Search
CPC ... H01R 12/71; H01R 43/205; G06F 13/4022; G02B 6/2804

USPC .......................................................... 385/24
See application file for complete search history.

(56) References Cited

U.S. PATENT DOCUMENTS

| 5,793,909 | A | * | 8/1998 | Leone | ................. | H04B 10/071 385/134 |
|---|---|---|---|---|---|---|
| 6,528,737 | B1 | | 3/2003 | Kwong et al. | | |
| 6,748,474 | B1 | | 6/2004 | Caldara et al. | | |
| 7,042,737 | B1 | * | 5/2006 | Woolsey | .............. | H05K 7/1445 174/384 |
| 7,445,457 | B1 | | 11/2008 | Frangioso, Jr. et al. | | |
| 7,516,272 | B2 | | 4/2009 | Felton et al. | | |
| 7,783,818 | B1 | | 8/2010 | Sardella et al. | | |

(Continued)

OTHER PUBLICATIONS

U.S. Appl. No. 14/581,119, filed Dec. 23, 2014, Midplane Interconnect System With Conductor Twist Mitigation.

(Continued)

*Primary Examiner* — Thomas A Hollweg
*Assistant Examiner* — Guy Anderson
(74) *Attorney, Agent, or Firm* — Schwegman Lundberg & Woessner, P.A.

(57) ABSTRACT

A cabled midplane interconnect system includes a cabled midplane interconnect having a first connection and a second connection. A first circuit board has a third connection configured to be coupled to the first connection. A second circuit board has a fourth connection configured to be coupled to the second connection. The connection orientations are assigned such that a midplane cable, having a plurality of conductors, couples the first connection to the second connection so that none of the plurality of conductors crosses another of the plurality of conductors.

11 Claims, 8 Drawing Sheets

(56) References Cited

U.S. PATENT DOCUMENTS

| | | | |
|---|---|---|---|
| 8,060,682 B1 | 11/2011 | Genetti et al. | |
| 8,285,758 B1 | 10/2012 | Bono et al. | |
| 8,338,713 B2* | 12/2012 | Fjelstad | H01R 12/523 |
| | | | 174/251 |
| 8,721,348 B2* | 5/2014 | Costello | H05K 7/1438 |
| | | | 439/377 |
| 8,749,986 B1 | 6/2014 | Peterson et al. | |
| 8,948,166 B2* | 2/2015 | Leigh | H04L 49/00 |
| | | | 370/386 |
| 9,054,467 B2* | 6/2015 | Hamner | H01R 12/716 |
| 9,113,568 B2* | 8/2015 | Rossman | H01R 13/648 |
| 9,413,097 B2* | 8/2016 | Tamarkin | H01R 13/502 |
| 9,653,124 B2* | 5/2017 | Heyd | G11B 33/128 |
| 2002/0181215 A1 | 12/2002 | Guenthner | |
| 2004/0193791 A1 | 9/2004 | Felton et al. | |
| 2008/0310134 A1 | 12/2008 | Curtis et al. | |
| 2008/0315985 A1 | 12/2008 | Johnsen et al. | |
| 2010/0165984 A1 | 7/2010 | Aybay et al. | |
| 2012/0122335 A1* | 5/2012 | Costello | H04Q 1/025 |
| | | | 439/502 |
| 2013/0084735 A1* | 4/2013 | Costello | H04Q 1/025 |
| | | | 439/502 |
| 2013/0112468 A1* | 5/2013 | Cohen | H05K 1/115 |
| | | | 174/262 |
| 2013/0288539 A1* | 10/2013 | McClellan | H01R 9/22 |
| | | | 439/686 |
| 2013/0337665 A1* | 12/2013 | Cohen | H05K 1/115 |
| | | | 439/65 |
| 2014/0170865 A1 | 6/2014 | Peterson et al. | |
| 2014/0215458 A1 | 7/2014 | Devarapalli et al. | |
| 2014/0360753 A1* | 12/2014 | Sechrist | H05K 7/1449 |
| | | | 174/79 |
| 2015/0173236 A1 | 6/2015 | Pipkin et al. | |
| 2015/0194751 A1* | 7/2015 | Herring | H04Q 1/15 |
| | | | 439/78 |
| 2015/0257304 A1* | 9/2015 | Lehman | H05K 7/1491 |
| | | | 361/692 |
| 2015/0271938 A1* | 9/2015 | Sechrist | H05K 7/1491 |
| | | | 361/822 |
| 2015/0296652 A1* | 10/2015 | Rossman | H04Q 1/06 |
| | | | 361/826 |
| 2015/0351233 A1 | 12/2015 | Peterson et al. | |
| 2016/0077841 A1 | 3/2016 | Lambert et al. | |
| 2016/0181711 A1 | 6/2016 | Genetti et al. | |

OTHER PUBLICATIONS

"U.S. Appl. No. 14/581,119, Final Office Action dated Dec. 5, 2016", 12 pgs.

"U.S. Appl. No. 14/581,119, Non Final Office Action dated May 20, 2016", 11 pgs.

"U.S. Appl. No. 14/581,119, Notice of Allowance dated Mar. 1, 2017", 9 pgs.

"U.S. Appl. No. 14/581,119, Response filed Feb. 2, 2017 to Final Office Action dated Dec. 5, 2016", 5 pgs.

"U.S. Appl. No. 14/581,119, Response filed Apr. 22, 2016 to Restriction Requirement dated Feb. 25, 2016", 7 pgs.

"U.S. Appl. No. 14/581,119, Response filed Aug. 8, 2016 to Non Final Office Action dated May 20, 2016", 6 pgs.

"U.S. Appl. No. 14/581,119, Restriction Requirement dated Feb. 25, 2016", 6 pgs.

"International Application Serial No. PCT/US2015/063750, International Search Report dated Mar. 23, 2016", 4 pgs.

"International Application Serial No. PCT/US2015/063750, Written Opinion dated Mar. 23, 2016", 7 pgs.

* cited by examiner

MIDPLANE INTERCONNECT SYSTEM WITH CONDUCTOR TWIST MITIGATION

This application is a divisional of U.S. patent application Ser. No. 14/581,119, filed Dec. 23, 2014, which is incorporated herein by reference in entirety.

TECHNICAL FIELD

Embodiments described herein generally relate to midplanes.

BACKGROUND

A backplane is a group of electrical connectors in parallel with each other so that each pin of each connector is linked to the same relative pin of all the other connectors forming a computer bus. It may be used as a backbone to connect several printed circuit boards together to make up a complete computer system.

Some backplanes may be constructed with slots for connecting to devices on both sides. These may be referred to as midplanes. The ability to plug cards into either side of a midplane is often useful in systems such as network switches. For example, a midplane may be used where one side of a chassis accepts system processing cards and the other side of the chassis accepts network interface cards.

As signaling rates of circuits increase, the insertion loss budgets of the electrical channels (e.g., Director Class switch) decrease. For example, a line card switch port may be connected to other line card switch ports through the midplane. In order to maintain signal integrity attributes of an electrical channel, the insertion loss of individual components that comprise the electrical channel should be reduced. There are general needs for reducing insertion loss of network switches.

DETAILED DESCRIPTION

Midplane interconnects may be used in systems (e.g., Director-class switches) to interconnect circuit boards (e.g., printed circuit boards) to other circuit boards. Midplane interconnects may be constructed of a printed circuit board (i.e., midplane) or of individual wires (i.e., cabled midplane). For example, FIG. 1 illustrates a typical cabled midplane interconnect 100.

Figure 1:
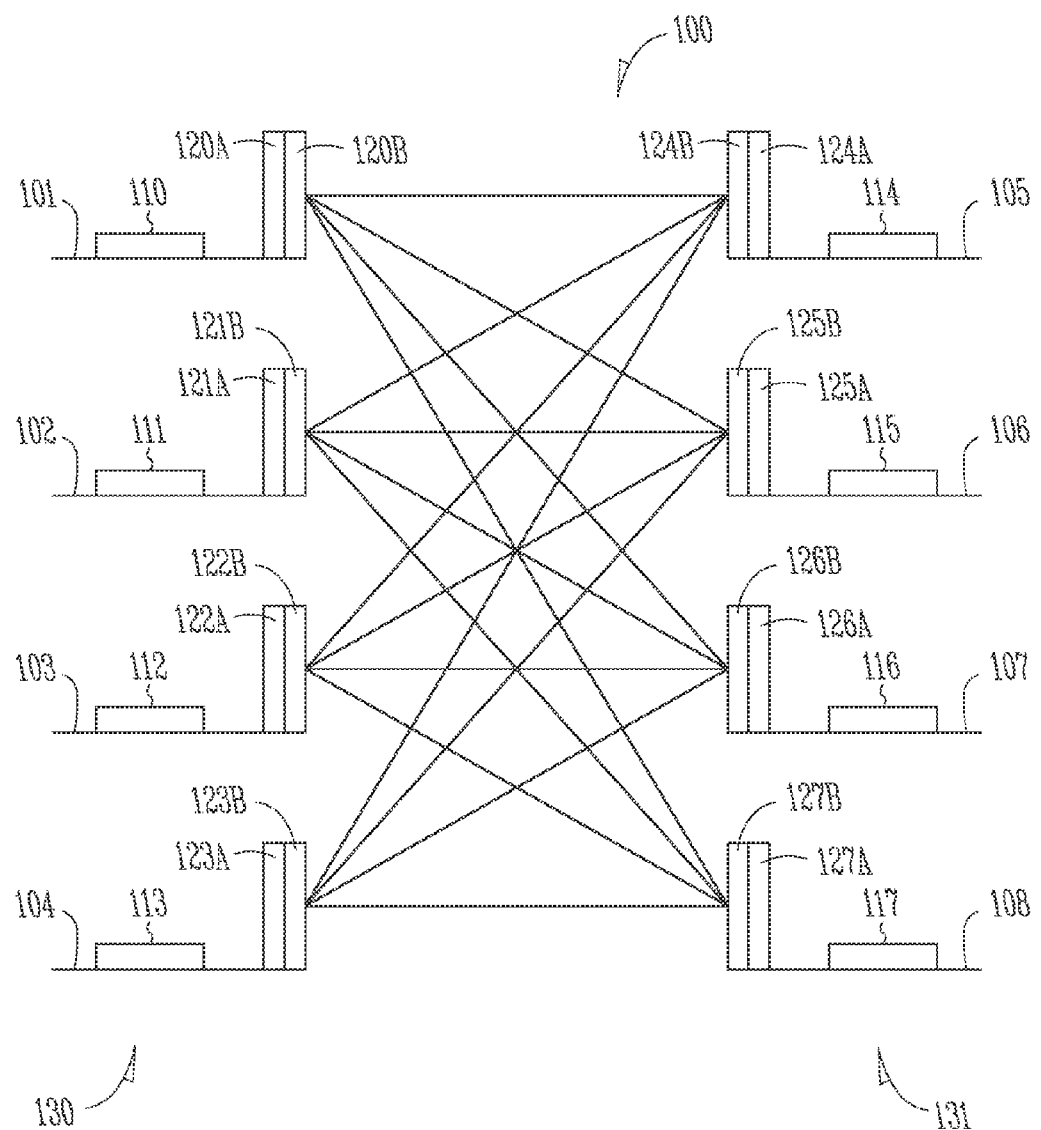
FIG. 1 illustrates a typical cabled midplane interconnect.

The cabled midplane interconnect 100 of FIG. 1 couples a first side 130 of the system to a second side 131 of the system. The system may be a switching system that includes a plurality of printed circuit boards 101-108 (i.e., PCB, circuit board, circuit card, line card), each circuit board having respective circuitry 110-117 (e.g., transmit and receive circuitry, switches, power, logic) coupled to respective ports (e.g., connectors) 120A-127A on the circuit boards.

The midplane interconnect 100 includes connectors (e.g., ports) 120B-127B that mate with respective connectors 120A-127A on the circuit boards 101-108. Thus, the cabled midplane interconnect 100 provides the connections from the circuit boards 101-104 on the first side 130 to the circuit boards 105-108 on the second side 131. Subsequent reference to connectors 120A-127A of the respective circuit boards 101-108 will be assumed to also include the connecting midplane interconnect connector 120B-127B.

The cabled midplane interconnect 100 comprises cables (e.g., individual wires, coaxial cable, twisted shielded wires, optical fiber) to accomplish the interconnection between the two sides 130, 131 of the system. Each connector connection may be referred to as a channel. Each connector may be coupled to a transmitter (TX) circuit and a receiver (RX) circuit wherein the TX circuit is responsible for transmitting signals from one side of the system 130, 131 across the midplane interconnect 100 to an associated RX circuit on the other side 131, 130 of the system.

For example, circuit board 101 may have TX circuitry 110 that transmits signals, through the midplane interconnect 100, to RX circuitry 114-117 on each of circuit boards 105-108. Thus, the midplane interconnect cables couple the transmit circuit board connector 120A to the receive connectors 124A-127A of the respective circuit boards 105-108. Similarly, the connectors 121A-123A of respective circuit boards 102-104 are coupled through the cables of the midplane interconnect 100 to connectors 124A-127A of respective circuit boards 105-108. Thus, the cables in the midplane interconnect tend to overlap and twist, causing increased size of the cabling as well as increased insertion losses. The overlapping and twisting may lead to longer interconnects than what a passive midplane interconnect cable may reach such that midplane optical transceivers and cables are used to compensate for the limited reach passive cables. This may result in both increased switch interconnect cost and increased power consumption.

Figure 8:
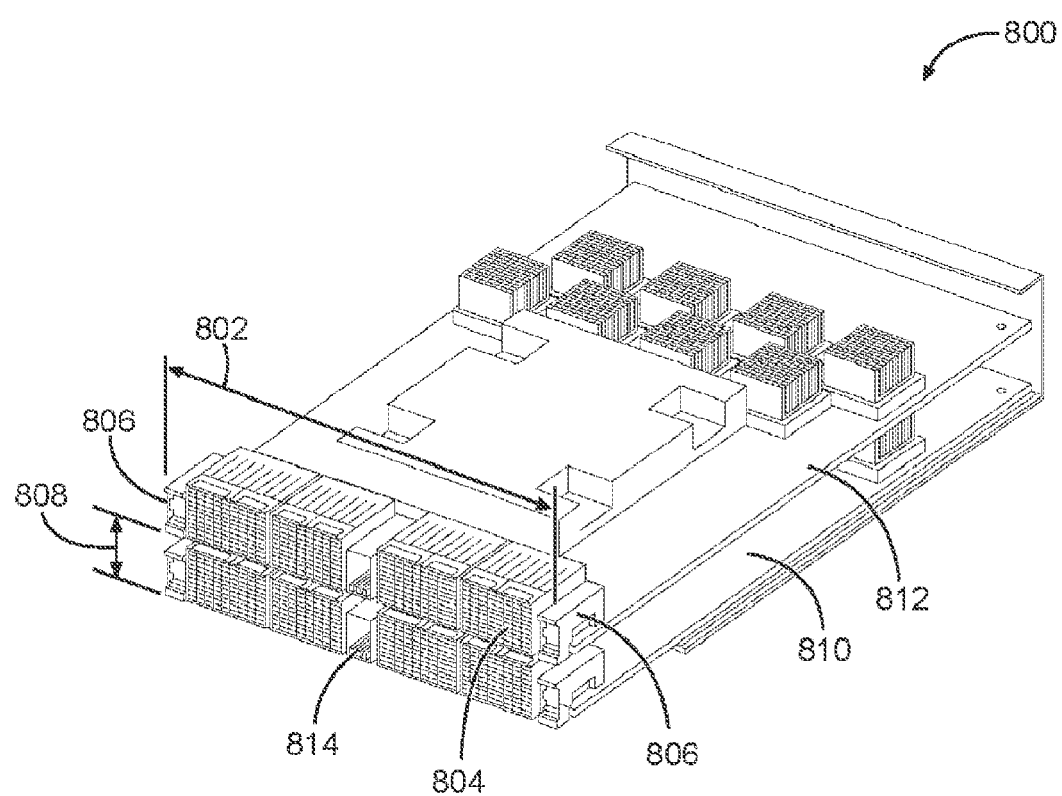
FIG. 8 illustrates a perspective view of a midplane connector envelope for purposes of describing example embodiments.

FIG. 8 is a perspective view of a line card module showing the midplane connector envelope 800. The midplane connector envelope 800 has a card width 802 that maximizes connector packaging density by reducing spacing between the connectors 804 (of which four are shown per card in FIG. 8) and the guide modules 806 (of which two are shown per card in FIG. 8). A minimum vertical pitch 808 between adjacent boards 810, 812 provides the greatest density, hence the shortest cabling lengths, which provides the smallest insertion loss. A power module 814 supplies power to the line cards 810, 812.

Each midplane connector 104 comprises multiple columns and multiple rows. In this embodiment, each column is a cable slice including multiple connectors. As these cable slices are placed, any overlap or twist of the cables which cause the width to grow larger than the column pitch, in both an x and y direction, will cause a decrease in density and an increase in connector length.

Subsequently described embodiments assign connector signals for the midplane interconnect in such a way as to reduce or eliminate cable twist and cable overlap for the midplane interconnect. The orientation of the circuit boards with respect to each other also affects the connector signal assignments of the midplane interconnect. Various embodiments are discussed subsequently with reference to FIGS. 2-5. As used here, a cable comprise a plurality of conductors and a cable twist may be a rotation of one end of the cable, while another end of the cable is stationary, such that at least some of the individual conductors of the cable are crossing or overlapping.

The connector signal assignments of the embodiments results in increased packing density of the circuit boards 101-108 by reducing the cable cross-section width to be equal to or less than a pitch of the circuit board connector connection envelope. The increased packing density results in reduced cable length which directly reduces insertion loss on a passive midplane interconnect channel.

Figure 2:
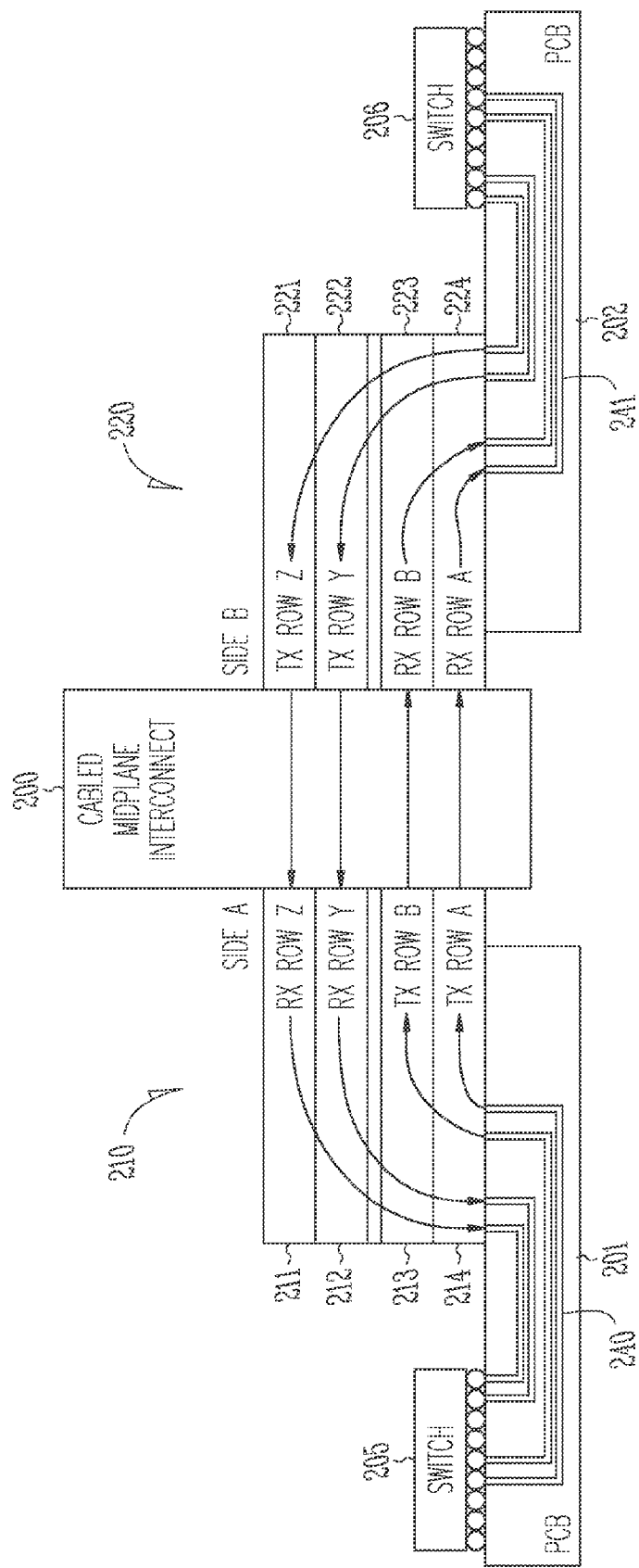
FIG. 2 illustrates a block diagram of an embodiment of a midplane interconnect system with cable twist mitigation.

FIG. 2 illustrates a block diagram of an embodiment of a midplane interconnect system with cable twist mitigation. The midplane interconnect 200, for this embodiment as well as the following embodiments, is shown as a cabled midplane interconnect 200 that may use any type of cable as discussed previously. For purposes of brevity and clarity, the midplane interconnect connectors (e.g., connectors) are not shown. These connectors are assumed to have the same row assignment (i.e., connector pin assignment, connection) as that shown for the coupled circuit board connector.

FIG. 2 shows two printed circuit boards 201, 202 with respective circuitry 205, 206 disposed thereon. The circuit board 201 on Side "A" is coupled to one side of the midplane interconnect 200 and the circuit board 202 on Side "B" is coupled to the opposing side of the midplane interconnect 200.

Figure 7:
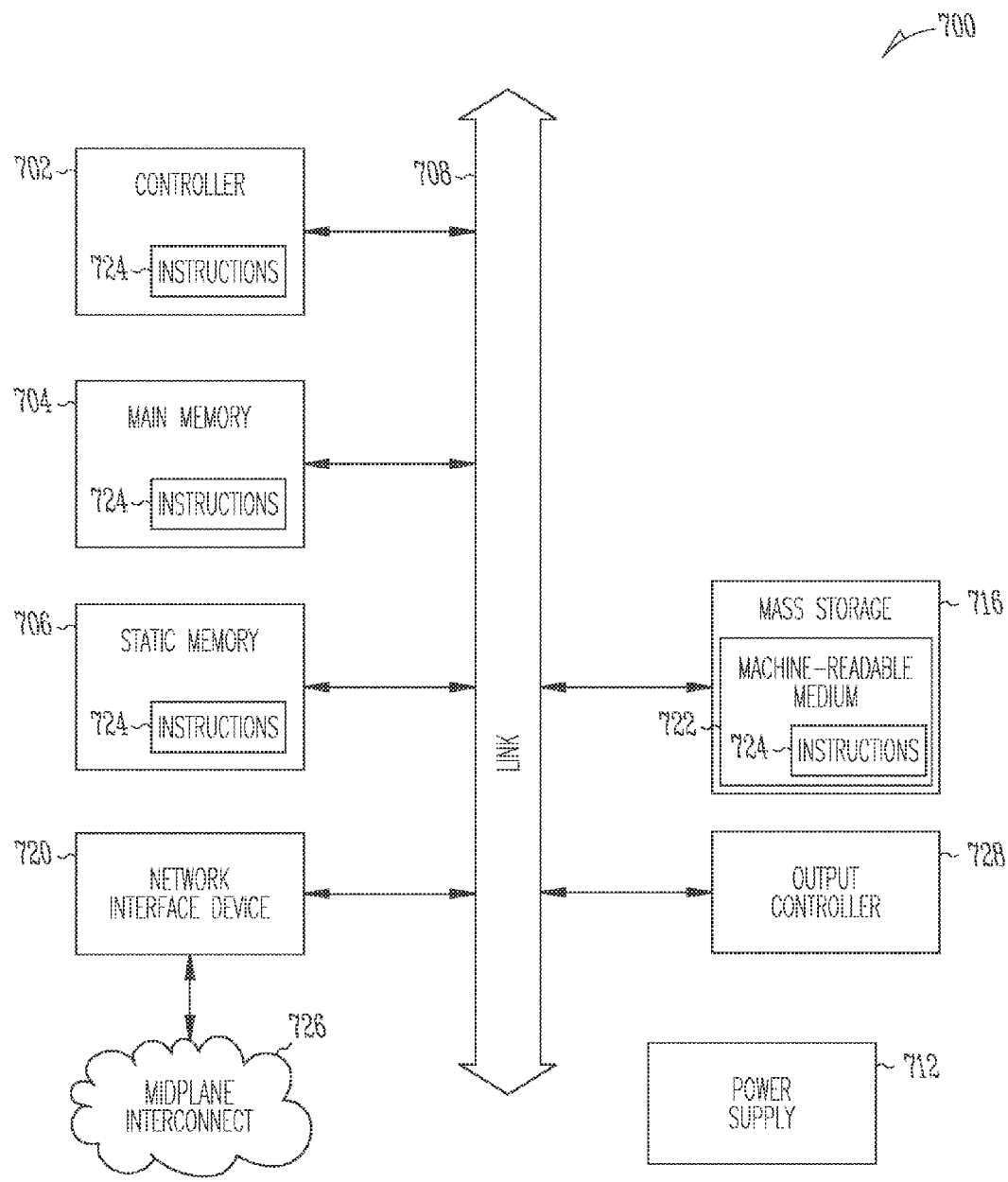
FIG. 7 illustrates a block diagram of an embodiment of a printed circuit board in accordance with various embodiments.

In the illustrated embodiment, the circuitry 205, 206 includes switching circuitry with accompanying transmitter and receiver circuitry (e.g., buffers, amplifiers) as indicated by the connector row assignments (e.g., TX or RX). An embodiment of such circuitry is illustrated in FIG. 7 and discussed subsequently. However, the present embodiments are not limited to any particular circuitry.

The circuitry 205, 206 are coupled to respective circuit board connectors 210, 220 through a plurality of conductors 240, 241 (e.g., printed circuit board traces). Each conductor of the plurality of conductors 240, 241 on each circuit board 201, 202 is assumed to be coupled to a different connection of its respective connector 210, 220.

Each circuit board connector 210, 220 comprises a plurality of respective connections (e.g., pinouts), that may also be referred to as rows 211-214 and 221-224. Each row is labeled according to the function it is coupled to on its respective circuitry 205, 206. The TX channel on one side (e.g., Side "B") is connected through the midplane interconnect 200 to the RX channel on the other side (e.g., Side "A"). For example, connection 211 is coupled to RX circuitry on its respective circuit board 201 and connection 221 is coupled to TX circuitry on its respective circuit board 202. Thus the circuitry 206 on the Side "B" circuit board 202 is configured to transmit a signal, through its respective connection 221 of the midplane interconnect, to the circuitry 205 on Side "A" circuit board 201, through its respective connection 211 of the midplane interconnect.

Figure 3:
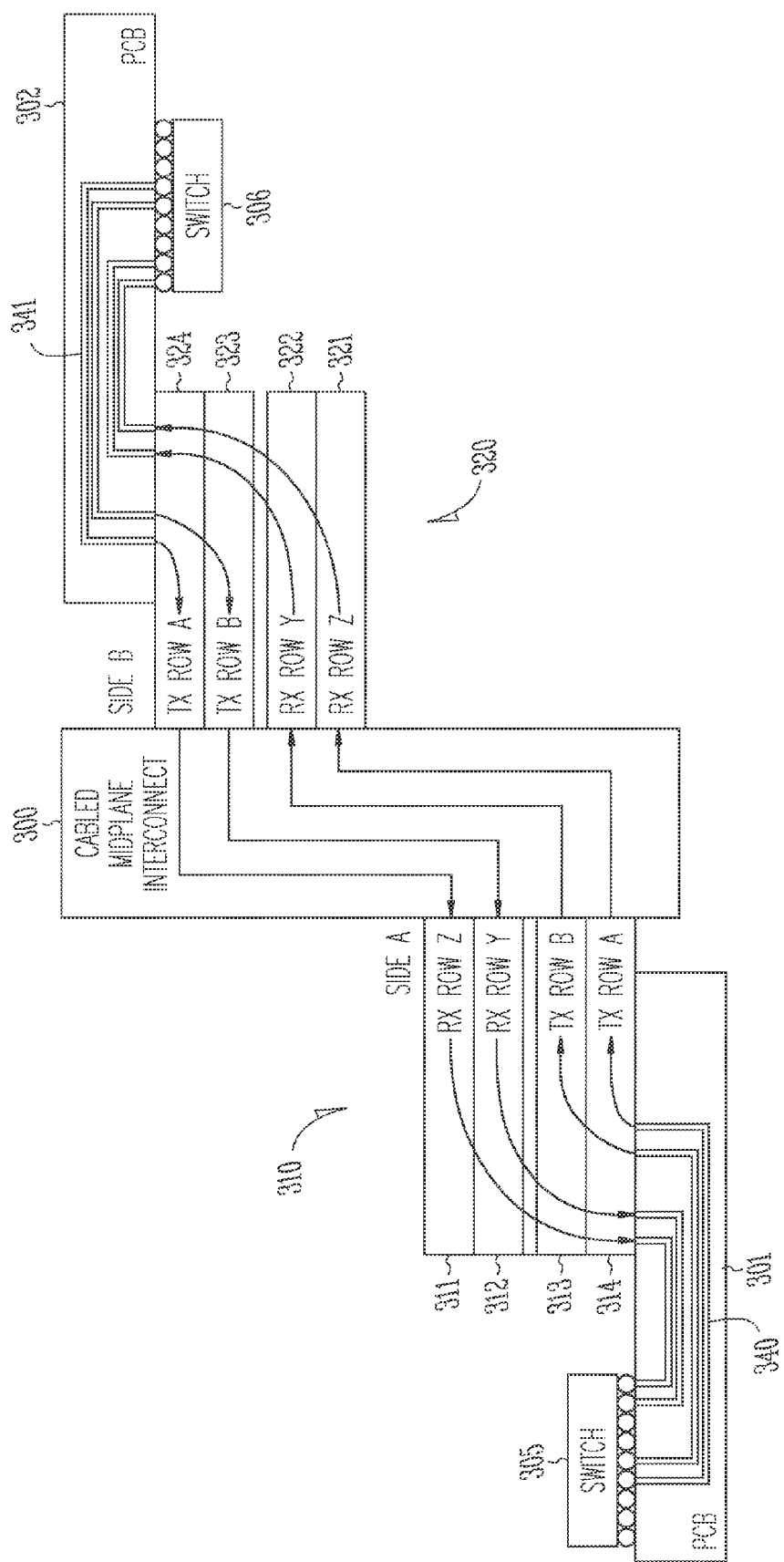
FIG. 3 illustrates a block diagram of another embodiment of the midplane interconnect system with cable twist mitigation.

FIG. 3 illustrates a block diagram of another embodiment of the midplane interconnect system with cable twist mitigation. In this embodiment, the Side "B" circuit board 302 is connected to the midplane interconnect 300 with a different orientation. The illustrated orientation has the Side "B" circuit board 302 upside down with respect to the Side "A" circuit board 301.

FIG. 3 shows two printed circuit boards 301, 302 with respective circuitry 305, 306 disposed thereon. The circuit board 301 on Side "A" is coupled to one side of the midplane interconnect 300 and the circuit board 302 on Side "B" is coupled to the opposing side of the midplane interconnect 300.

In the illustrated embodiment, the circuitry 305, 306 includes switching circuitry with accompanying transmitter and receiver circuitry (e.g., buffers, amplifiers) as indicated by the connector row assignments (e.g., TX or RX). An embodiment of such circuitry is illustrated in FIG. 7 and discussed subsequently. However, the present embodiments are not limited to any particular circuitry.

The circuitry 305, 306 are coupled to respective circuit board connectors 310, 320 through a plurality of conductors 340, 341 (e.g., printed circuit board traces). Each conductor of the plurality of conductors 340, 341 on each circuit board 305, 306 is assumed to be coupled to a different connection of its respective connector 310, 320.

Each circuit board connector 310, 320 comprises a plurality of respective connections, also referred to as rows 311-314 and 321-324. Each row is labeled according to the function it is coupled to on its respective circuitry 305, 306. The TX channel on one side (e.g., Side "B") is connected through the midplane interconnect 300 to the RX channel on the other side (e.g., Side "A"). For example, connection 311 is coupled to RX circuitry on its respective circuit board 301 and connection 324 is coupled to TX circuitry on its respective circuit board 302. Thus the circuitry 306 on the Side "B" circuit board 302 is configured to transmit a signal, through its respective connection 324 of the midplane interconnect, to the circuitry 305 on Side "A" circuit board 301, through its respective connection 311 of the midplane interconnect.

In the embodiments of both FIGS. 2 and 3, the circuit card 201, 301 on Side "A" has the TX connections 213, 214, 313, 314 and RX connections 211, 212, 311, 312 on the midplane interconnect 200, 300 in the same location on their respective connectors 210, 310. In the illustrated embodiments, the TX channels are on the bottom connections 213, 214, 313, 314 (i.e., rows B and A) while the RX channels are on the top connections 211, 212, 311, 312 (i.e., rows Z and Y). The assignment of connections (e.g., channels) on the side "B" circuit board connector 220, 320 are then made such that a TX connection is directly across from its associated RX connection.

In FIG. 2, for example, since both circuit boards 201, 202 are in the same orientation, the Side "A" and Side "B" connections (i.e., rows A, B, Y, Z) are directly opposite from each other. In other words, PCB Side "A", row A (pcbA.rA) is opposite PCB Side "B", row A (pchB.rA) (i.e., pcbA.rA→pcbB.rA). Similarly, pcbA.rB→pcbB.rB; pcbA.rY←pcbB.rY; pcbA.rZ←pcbB.rZ.

By assigning the RX connections on the bottom connections (Rows A & B) of the side "B" circuit board 202 and the TX connections on the top of the connector (Rows Y & Z), a midplane interconnect cable may be constructed that connects Side "A" to Side "B" without a midplane twist. Such a method works for any orientation of circuit boards having the same row to same row connector orientation. While FIG. 2 shows both Side "A" and Side "B" with the circuit board 201, 202 oriented with switch circuitry 205, 206 facing up the same method of connection assignment may also be used if both circuit boards 201, 202 oriented with switch circuitry 205, 206 facing down.

FIG. 3 illustrates circuit boards (Side "A" and Side "B") having an opposing orientation with respect to each other. In the illustrated embodiment, the Side "A" circuit board 301 switch circuitry 305 is facing up and the Side "B" circuit board switch circuitry 306 is facing down. Another embodiment may reverse this orientation.

In the embodiment of FIG. 3, pcbA.rA→pcbB,rZ; pcbA.rB→pcbB.rY; pcbA.rY←pcbB.rB; pcbA.rZ←prbB.rA. By assigning the circuit board 302 on Side "B" with the TX connections on the bottom of the connector (i.e., Rows A & B), and with the RX connections on the top of the connector (i.e., Rows Y & Z), a midplane interconnect cable may be constructed that connects Side "A" to Side "B" without a midplane twist.

Figure 4:
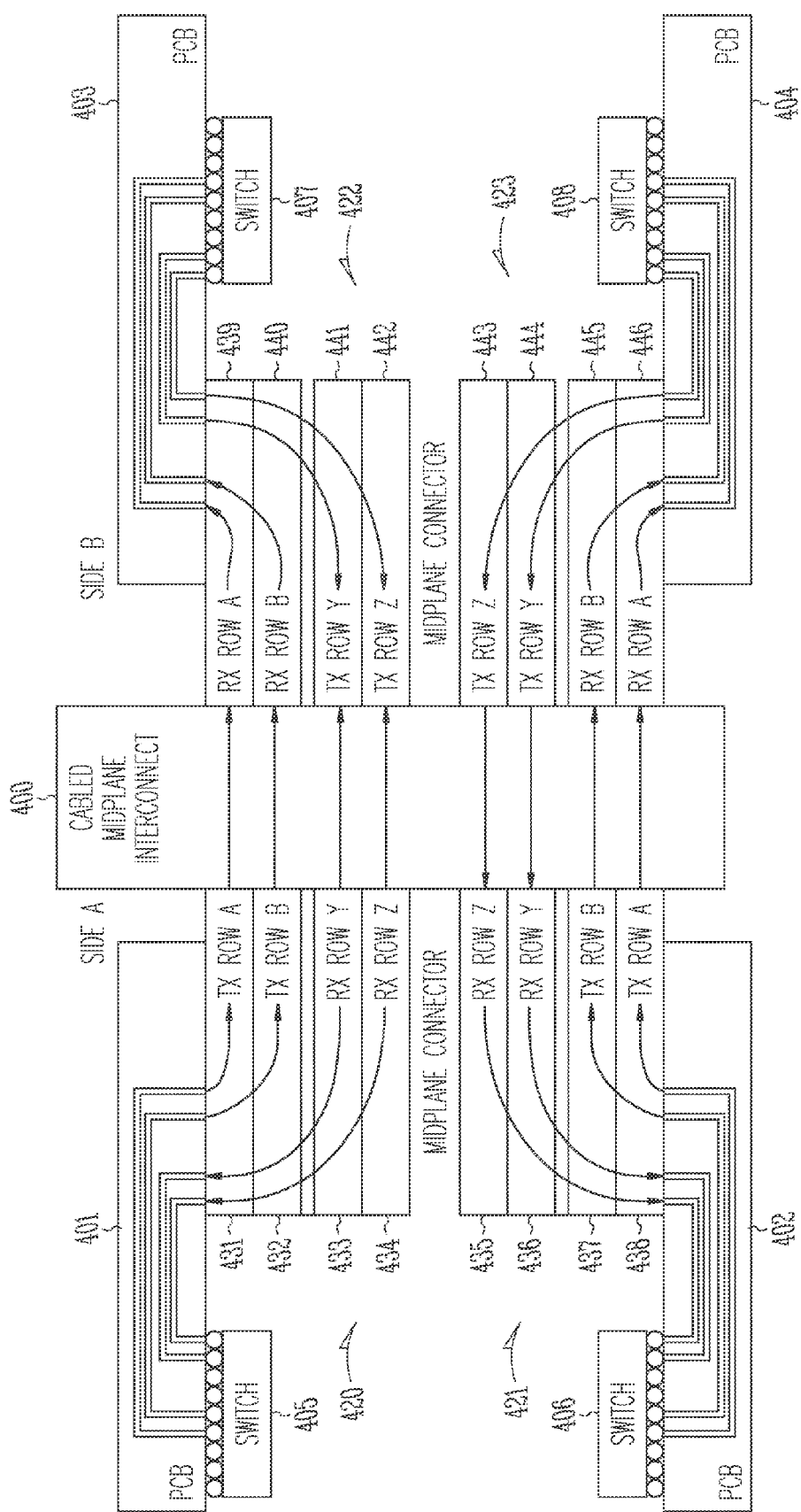
FIG. 4 illustrates a block diagram of yet another embodiment of the midplane interconnect system with cable twist mitigation.

FIG. 4 illustrates a block diagram of yet another embodiment of the midplane interconnect system with cable twist mitigation. This embodiment shows four circuit boards 401-404 in which directly opposing circuit boards are coupled directly together.

The Side "A" circuit boards 401, 402 include respective circuitry 405, 406 coupled through conductors to their respective connectors 420, 421. Each connector 420, 421 includes respective connections 431-434 and 435-438. Each connector 420, 421 has the TX connections 431, 432, 437, 438 on the bottom of their respective connectors 420, 421 nearest the circuit board 401, 402 while the RX connections 433, 434, 435, 436 are on the top of their respective connectors 420, 421. In other words, both of the Side "A" circuit boards 401, 402 have the same connection assignment orientation.

The Side "B" circuit boards 403, 404 include respective circuitry 407, 408 coupled through conductors to their respective connectors 422, 423. Each connector 422, 423 includes respective connections 439-442 and 443-446. Each connector 422, 423 has the TX connections 441, 442, 443, 444 on the top of their respective connectors 422, 423 while the RX connections 439, 440, 445, 446 are on the bottom of their respective connectors 422, 423 nearest the circuit board 403, 404. In other words, both of the Side "B" circuit boards 403, 404 have the same connection assignment orientation.

The connection assignment orientation of the Side "B" circuit boards 403, 404 is opposite that of the Side "A" circuit boards 401, 402. This enables a direct connection between the directly opposing circuit boards. For example, the TX connections 431, 432 of the top circuit board 401 on Side "A" may be directly connected without twists to the RX connections 439, 440 of the top circuit board 403 on Side "B". Similarly, the TX connections 441, 442 of the top circuit board 403 on Side "B" may be directly connected without twists to the RX connections 433, 434 of the top circuit board 401 on Side "A". The orientation and connections between the bottom circuit boards 402, 404 are substantially similar to the above.

Figure 5:
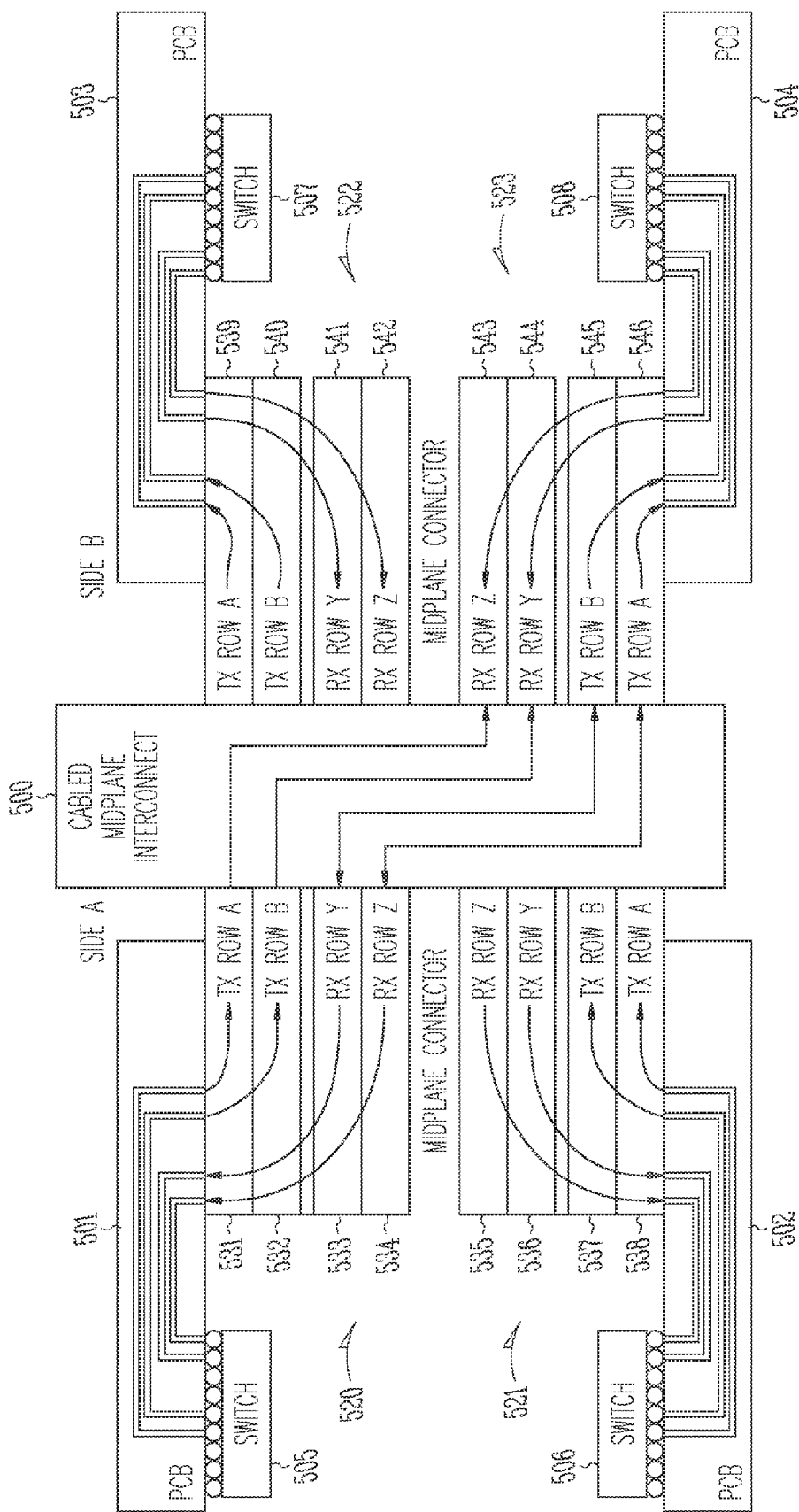
FIG. 5 illustrates a block diagram of yet another embodiment of the midplane interconnect system with cable twist mitigation.

FIG. 5 illustrates a block diagram of yet another embodiment of the midplane interconnect system with cable twist mitigation. This embodiment shows four circuit boards 501-504 in which diagonally opposite circuit boards are coupled directly together.

The Side "A" circuit boards 501, 502 includes respective circuitry 505, 506 coupled through conductors to their respective connectors 520, 521. Each connector 520, 521 includes respective connections 531-534 and 535-538. Each connector 520, 521 has the TX connections 531, 532, 537, 538 on the bottom of their respective connectors 520, 521 nearest the circuit board 501, 502 while the RX connections 533, 534, 535, 536 are on the top of their respective connectors 520, 521. In other words, both of the Side "A" circuit boards 501, 502 have the same connector connection assignment orientation.

The side "B" circuit boards 503, 504 include respective circuitry 507, 508 coupled through conductors to their respective connectors 522, 523. Each connector 522, 523 includes respective connections 539-542 and 543-546. Each connector 522, 523 has the TX connections 539, 540, 545, 546 on the bottom of their respective connectors 522, 523 nearest the circuit board 503, 504 while the RX connections 541, 542, 543, 544 are on the top of their respective connectors 522, 523. In other words, both of the Side "B" circuit boards 503, 504 have the same connector connection assignment orientation. Additionally, in this embodiment, all of the circuit boards 501-504 have the same connector connection orientation with respect to each other. FIG. 5 midplane 500 shows circuit board 501 connection to circuit board 504. Connection are not shown but are assumed for circuit board 502 connection to circuit board 503.

The connection assignment orientation of the Side "B" circuit board 504 is the same as that of the Side "A" circuit board 501. Since the Side "B" circuit board 504 is inverted with respect to the Side "A" circuit board 501, the connections of the Side "B" circuit board connector 523 may be made directly to the Side "A" circuit board connector 520. For example, the TX connections 545, 546 of the bottom circuit board 504 on Side "B" may be directly connected without twists to the RX connections 533, 534 of the top circuit board 501 on Side "A". Similarly, the TX connections 531, 532 of the top circuit board 501 on Side "A" may be directly connected without twists to the RX connections 543, 544 of the bottom circuit board 504 on Side "B".

Figure 6:
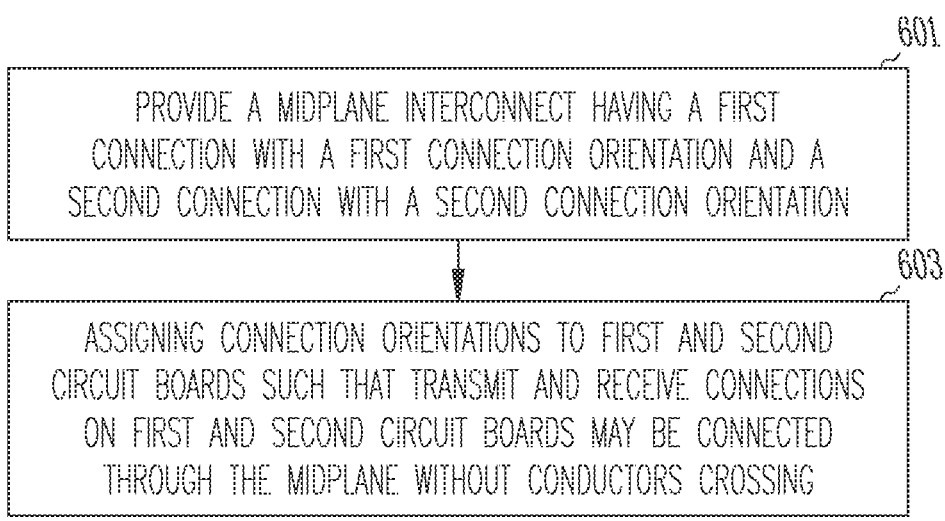
FIG. 6 illustrates a flowchart of an embodiment of a method for mitigating cable twist in a midplane interconnect system.

FIG. 6 illustrates a flowchart of an embodiment of a method for mitigating cable twist in a midplane interconnect system. The method includes, in block 601, providing a midplane having a first connector with a first connection orientation and a second connector having a second connection orientation. In block 603, connection orientations are assigned to connectors of first and second circuit boards such that transmit connections on the first circuit board may be connected to receive connections on the second circuit board, when the first and second circuit boards are coupled to the midplane interconnect, without midplane cable conductors crossing or the cable being twisted.

FIG. 7 is a block diagram illustrating an apparatus in the example form of a circuit board apparatus 700 (e.g., Director Class Network Switch (DCNS)). The above-described circuit boards may be implemented in a switching system) using one or more of the blocks illustrated in FIG. 7.

The apparatus 700 may include at least one controller 702 (e.g., a central processing unit (CPU), a graphics processing unit (GPU) or both, processor cores, compute nodes, etc.), a main memory 704 and a static memory 706 that communicate with each other via a link 708 (e.g., bus). The apparatus 700 may additionally include a storage device 716 (e.g., a drive unit), and a network interface device 720. The network interface device 720 may include switches, transmitter circuitry and/or receiver circuitry to couple the apparatus to the midplane interconnect 726.

The storage device 716 includes a computer-readable medium 722 on which is stored one or more sets of data structures and instructions 724 (e.g., software) embodying, or utilized by any one or more of the methodologies or functions described herein. The instructions 724 may also reside, completely or at least partially, within the main memory 704, static memory 706, and/or within the processor 702 during execution thereof by the communication apparatus 700, with the main memory 704, static memory 706, and the processor 702 also constituting computer-readable media.

While the computer-readable medium 722 is illustrated in an example embodiment to be a single medium, the term "computer-readable medium" may include a single medium or multiple media (e.g., a centralized or distributed database, and/or associated caches and servers) that store the one or more instructions 724.

The apparatus 700 may further include a power supply module 712. The power supply module 712 may provide power for both the apparatus 700 as well as other circuit boards in the system.

The apparatuses, devices, and methods described above may include or be included in high-speed computers, communication and signal processing circuitry, single or multi-processor modules, single or multiple embedded processors, multi-core processors, message information switches, and application-specific modules including multilayer, multi-chip modules. Such apparatuses may further be included as sub-components within a variety of other apparatuses (e.g., electronic systems), such as televisions, cellular telephones, personal computers (e.g., laptop computers, desktop computers, handheld computers, etc.), tablets (e.g., tablet computers), workstations, radios, video players, audio players (e.g., MP3 (Motion Picture Experts Group, Audio Layer 3) players), vehicles, medical devices (e.g., heart monitor, blood pressure monitor, etc.), set top boxes, and others.

The Abstract is submitted with the understanding that it will not be used to limit or interpret the scope or meaning of the claims. The following claims are hereby incorporated into the detailed description, with each claim standing on its own as a separate embodiment.

EXAMPLES

The following examples pertain to further embodiments.

Example 1 is a system comprising: a cabled midplane interconnect having a first connection and a second connection; a first circuit board having a third connection configured to be coupled to the first connection; and a second circuit board having a fourth connection configured to be coupled to the second connection, wherein the fourth connection is configured such that a midplane cable, having a plurality of conductors, couples the first connection to the second connection such that none of the plurality of conductors crosses another of the plurality of conductors.

In Example 2, the subject matter of Example 1 can optionally include wherein the system is a Director Class Network Switch.

In Example 3, the subject matter of Examples 1-2 can optionally include wherein each of the first and second circuit boards comprise switching circuitry.

In Example 4, the subject matter of Examples 1-3 can optionally include wherein the third connection comprises a first plurality of transmit connections and a first plurality of receive connections and the fourth connection comprises a second plurality of transmit connections and a second plurality of receive connections wherein the fourth connection is configured such that the first plurality of transmit connections are coupled to the midplane interconnect directly across from the second plurality of receive connections.

In Example 5, the subject matter of Examples 1-4 can optionally include wherein the fourth connection is further configured such that the first plurality of receive connections are coupled to the midplane interconnect directly across from the second plurality of transmit connections.

In Example 6, the subject matter of Examples 1-5 can optionally include wherein the first and second circuit boards have the same orientation with respect to their respective connections.

In Example 7, the subject matter of Examples 1-6 can optionally include wherein the first and second circuit boards have opposite orientations with respect to their respective connections.

In Example 8, the subject matter of Examples 1-7 can optionally include wherein the first circuit board is coupled to the midplane interconnect diagonally from the second circuit board.

In Example 9, the subject matter of Examples 1-8 can optionally include a third circuit board having a fifth connection and a fourth circuit board having a sixth connection wherein the first circuit board is coupled to the midplane interconnect directly across from the second circuit board and the third circuit board is coupled to the midplane interconnect directly across from the fourth circuit board, further wherein transmit connections of the third connection are coupled through the midplane interconnect directly across from receive connections of the fourth connection and transmit connections of the fifth connection are coupled through the midplane interconnect directly across from the receive connections of the sixth connection.

Example 10 is a cabled midplane interconnect, comprising: a first connector having a first connection orientation including a first plurality of transmit connections and a first plurality of receive connections; a second connector having a second connection orientation including a second plurality of transmit connections and a second plurality of receive connections; and a cable comprising a plurality of conductors, each conductor coupling a connection in the first connector with a corresponding connection in the second connector, wherein the second connection orientation is configured such that the first plurality of transmit connections is coupled to the second plurality of receive connections and the first plurality of receive connections is coupled to the second plurality of transmit connections such that none of the plurality of conductors crosses another one of the plurality of conductors.

In Example 11, the subject matter of Example 10 can optionally include wherein a total width of the plurality of conductors does not exceed a pitch of the first or second connectors.

In Example 12, the subject matter of Examples 10-11 can optionally include wherein the first connector is disposed on the midplane interconnect directly opposite the second connector.

In Example 13, the subject matter of Examples 10-12 can optionally include wherein the first connector is disposed on the midplane interconnect diagonally opposite the second connector.

In Example 14, the subject matter of Examples 10-13 can optionally include wherein the plurality of conductors comprise one or more of individual wires, coaxial cable, twisted shielded wires, and/or optical fiber.

Example 15 is a method for producing a cabled midplane interconnect, the method comprising: providing a midplane interconnect having a first connector and a second connector; and assigning a first connection orientation to the first connector and a second connection orientation to the second connector such that transmit and receive connections on first and second circuit boards are connected through a plurality of conductors of a midplane interconnect cable without any of the plurality of conductors overlapping another of the plurality of conductors.

In Example 16, the subject matter of Example 15 can optionally include assigning a transmit connection directly across the midplane interconnect from the first connector to a receive connection on the second connector; and assigning a receive connection directly across the midplane interconnect from the first connector to a transmit connection on the second connector.

In Example 17, the subject matter of Examples 15-16 can optionally include assigning a transmit connection diagonally across the midplane interconnect from the first connector to a receive connection on the second connector; and assigning a receive connection diagonally across the midplane interconnect from the first connector to a transmit connection on the second connector.

In Example 18, the subject matter of Examples 15-17 can optionally include wherein assigning the first connection orientation to the first connector and the second connection orientation to the second connector comprises assigning the first connection orientation to the first connector and the second connection orientation to the second connector such that the midplane interconnect cable is not twisted.

In Example 19, the subject matter of Examples 15-18 can optionally include wherein assigning the first connection orientation to the first connector and the second connection orientation to the second connector comprises assigning the first connection orientation to the first connector and the second connection orientation to the second connector such that the midplane interconnect cable has a width that is less than or equal to a pitch of the first or second connectors.

In Example 20, the subject matter of Examples 15-19 can optionally include providing the midplane interconnect cable configured to couple the first connector to the second connector such that the cable is not twisted.

What is claimed is:

1. A cabled midplane interconnect, comprising:
    a first connector having a first connection orientation including a first plurality of transmit connections and a first plurality of receive connections;
    a second connector having a second connection orientation including a second plurality of transmit connections and a second plurality of receive connections; and
    a cable comprising a plurality of conductors, each conductor coupling a connection in first connector with a corresponding connection in the second connector, wherein the second connection orientation is configured such that the first plurality of transmit connections is coupled to the second plurality of receive connections and the first plurality of receive connections is coupled to the second plurality of transmit connections such that none of the plurality of conductors crosses another one of the plurality of conductors, wherein the first connector is disposed on the cabled midplane interconnect on a first side of the cabled midplane interconnect opposite, with respect to a vertical center of the cabled midplane interconnect, a second side on which the second connector is disposed with the first connector laterally offset from the second connector along the first side of the cabled midplane interconnect such that the first connector is diagonally opposite the second connector, the vertical center being between the first side and the second side.

2. The cabled midplane interconnect of claim 1, wherein a total width of the plurality of conductors does not exceed a pitch of the first or second connectors.

3. The cabled midplane interconnect of claim 1, wherein the first connection orientation is an orientation opposite to the second connection orientation.

4. The cabled midplane interconnect of claim 1, wherein further comprising a number of connector pairs, in addition to the first connector and the second connector, and corresponding cables such that the connectors of each pair are coupled to each other in a manner identical to coupling of the first connector to the second connector.

5. The cabled midplane interconnect of claim 1, wherein the plurality of conductors comprise one or more of individual wires, coaxial cable, twisted shielded wires, and/or optical fiber.

6. A method for producing a cabled midplane interconnect, the method comprising:
    providing a midplane interconnect having a first connector and a second connector, the first connector being disposed on the cabled midplane interconnect on a first side of the cabled midplane interconnect opposite, with respect to a vertical center of the cabled midplane interconnect, a second side on which the second connector is disposed with the first connector being laterally offset from the second connector along the first side of the cabled midplane interconnect such that the first connector is diagonally opposite the second connector, the vertical center being between the first side and the second side; and
    assigning a first connection orientation to the first connector and a second connection orientation to the second connector such that transmit and receive connections on first and second circuit boards are connected through a plurality of conductors of a midplane interconnect cable without any of the plurality of conductors overlapping another of the plurality of conductors.

7. The method of claim 6, wherein assigning the first connection orientation includes assigning the first connection orientation with an orientation opposite to the second connection orientation.

8. The method of claim 6, wherein the midplane interconnect cable includes one or more of individual wires, coaxial cable, twisted shielded wires, and/or optical fiber.

9. The method of claim 6, wherein assigning the first connection orientation to the first connector and the second connection orientation to the second connector comprises assigning the first connection orientation to the first connector and the second connection orientation to the second connector such that the midplane interconnect cable is not twisted.

10. The method of claim 6, wherein assigning the first connection orientation to the first connector and the second connection orientation to the second connector comprises assigning the first connection orientation to the first connector and the second connection orientation to the second connector such that the midplane interconnect cable has a width that is less than or equal to a pitch of the first or second connectors.

11. The method of claim 6, further comprising providing the midplane interconnect cable configured to couple the first connector to the second connector such that the cable is not twisted.

* * * * *

UNITED STATES PATENT AND TRADEMARK OFFICE
CERTIFICATE OF CORRECTION

PATENT NO. : 9,954,295 B2
APPLICATION NO. : 15/583159
DATED : April 24, 2018
INVENTOR(S) : Genetti et al.

It is certified that error appears in the above-identified patent and that said Letters Patent is hereby corrected as shown below:

In the Claims

Column 9, Line 43, Claim 1, after "in", insert --the--

Signed and Sealed this
Eighteenth Day of June, 2019

Andrei Iancu
*Director of the United States Patent and Trademark Office*